(12) United States Patent
Kashiwamura

(10) Patent No.: US 11,597,381 B2
(45) Date of Patent: Mar. 7, 2023

(54) DRIVING ASSIST APPARATUS, DRIVING ASSIST METHOD, AND DRIVING ASSIST SYSTEM

(71) Applicant: Hitachi Automotive Systems, Ltd., Hitachinaka (JP)

(72) Inventor: Satoshi Kashiwamura, Atsugi (JP)

(73) Assignee: Hitachi Astemo, Ltd., Hitachinaka (JP)

(*) Notice: Subject to any disclaimer, the term of this patent is extended or adjusted under 35 U.S.C. 154(b) by 325 days.

(21) Appl. No.: 16/637,010

(22) PCT Filed: Aug. 23, 2018

(86) PCT No.: PCT/JP2018/031077
§ 371 (c)(1),
(2) Date: Feb. 6, 2020

(87) PCT Pub. No.: WO2019/044638
PCT Pub. Date: Mar. 7, 2019

(65) Prior Publication Data
US 2020/0254996 A1    Aug. 13, 2020

(30) Foreign Application Priority Data

Aug. 30, 2017   (JP) .............................. JP2017-165253

(51) Int. Cl.
*B60W 30/045*    (2012.01)
*B60W 10/04*    (2006.01)
(Continued)

(52) U.S. Cl.
CPC ............. *B60W 30/045* (2013.01); *B60T 7/12* (2013.01); *B60W 10/04* (2013.01);
(Continued)

(58) Field of Classification Search
None
See application file for complete search history.

(56) References Cited

U.S. PATENT DOCUMENTS

| 5,915,800 A | * | 6/1999 | Hiwatashi | ............. B60T 8/1755 |
| | | | | 303/146 |
| 2005/0125131 A1 | * | 6/2005 | Kato | ....................... B60T 8/172 |
| | | | | 701/70 |

(Continued)

FOREIGN PATENT DOCUMENTS

| JP | 11-78934 A | 3/1999 |
| JP | 2006-111183 A | 4/2006 |

(Continued)

OTHER PUBLICATIONS

International Search Report (PCT/ISA/210) issued in PCT Application No. PCT/JP2018/031077 dated Nov. 6, 2018 with English translation (five (5) pages).

(Continued)

*Primary Examiner* — Gennam M Mott
(74) *Attorney, Agent, or Firm* — Crowell & Moring LLP

(57) ABSTRACT

The present invention provides a driving assist apparatus, a driving assist method, and a driving assist system capable of realizing driving assist in consideration of a delay in a driver's operation regardless of a configuration of a vehicle. A driving assist apparatus includes a standard running route acquisition portion configured to acquire a standard running route calculated based on curve information ahead of a vehicle that is acquired by an external world recognition portion, and an actuator control output portion configured to acquire a standard vehicle motion amount when the vehicle runs the standard running route, calculate an instruction that guides a motion amount of the vehicle toward the standard vehicle motion amount based on the standard vehicle motion amount and a current vehicle motion amount of the vehicle, and output the instruction to an actuator portion configured to provide at least one of a curving force and a braking force to the vehicle.

10 Claims, 14 Drawing Sheets

(51) Int. Cl.
  *B60W 10/18* (2012.01)
  *B60W 10/20* (2006.01)
  *B60T 7/12* (2006.01)
  *B60W 10/184* (2012.01)
  *B62D 6/00* (2006.01)

(52) U.S. Cl.
  CPC .......... *B60W 10/184* (2013.01); *B60W 10/20* (2013.01); *B62D 6/002* (2013.01); *B60W 2520/06* (2013.01); *B60W 2520/10* (2013.01); *B60W 2520/125* (2013.01); *B60W 2520/14* (2013.01); *B60W 2552/30* (2020.02); *B60W 2710/18* (2013.01); *B60W 2710/20* (2013.01)

(56) References Cited

U.S. PATENT DOCUMENTS

| | | | | |
|---|---|---|---|---|
| 2009/0187322 | A1* | 7/2009 | Yasui | B60W 10/06 |
| | | | | 701/70 |
| 2012/0123643 | A1* | 5/2012 | Limpibuntering | B62D 15/025 |
| | | | | 701/42 |
| 2013/0131925 | A1 | 5/2013 | Isaji et al. | |
| 2015/0329108 | A1* | 11/2015 | Kodaira | B60W 10/18 |
| | | | | 701/41 |
| 2016/0101812 | A1* | 4/2016 | Niki | B62D 15/029 |
| | | | | 701/43 |
| 2016/0152232 | A1* | 6/2016 | Takahashi | B62D 5/0463 |
| | | | | 701/41 |
| 2016/0288785 | A1* | 10/2016 | Ezoe | B60W 30/18145 |
| 2017/0115662 | A1* | 4/2017 | Mori | B60W 30/045 |
| 2021/0053564 | A1* | 2/2021 | Imamura | B60T 8/1755 |

FOREIGN PATENT DOCUMENTS

| | | |
|---|---|---|
| JP | 2006-111184 A | 4/2006 |
| JP | 2008-68669 A | 3/2008 |
| JP | 2009-262837 A | 11/2009 |
| JP | 2010-162932 A | 7/2010 |
| JP | 2013-126854 A | 6/2013 |
| JP | 2016-78490 A | 5/2016 |

OTHER PUBLICATIONS

Japanese-language Written Opinion (PCT/ISA/237) issued in PCT Application No. PCT/JP2018/031077 dated Nov. 6, 2018 with English translation (16 pages).

\* cited by examiner

DRIVING ASSIST APPARATUS, DRIVING ASSIST METHOD, AND DRIVING ASSIST SYSTEM

TECHNICAL FIELD

The present invention relates to a driving assist apparatus, a driving assist method, and a driving assist system.

BACKGROUND ART

PTL 1 discloses a technique that takes a delay in a driver's operation into consideration when assisting driving for causing a yaw rate of a vehicle to follow a standard yaw rate by generating a difference in driving force between left and right driving wheels.

CITATION LIST

Patent Literature

[PTL 1] Japanese Patent Application Public Disclosure No. 2010-162932

SUMMARY OF INVENTION

However, the above-described conventional technique has such a problem that it requires a control mechanism actively controlling a distribution of a diving torque to transmit to the left and right driving wheels, and cannot be employed for a vehicle lacking this mechanism.

One of objects of the present invention is to provide a driving assist apparatus, a driving assist method, and a driving assist system capable of realizing driving assist in consideration of a delay in a driver's operation regardless of a configuration of a vehicle.

Solution to Problem

According to one aspect of the present invention, an apparatus acquires a standard vehicle motion amount when a vehicle runs a standard running route, calculates an instruction that guides a motion amount of the vehicle toward the standard vehicle motion based on the standard vehicle motion amount and a current vehicle motion amount, and outputs this instruction to an actuator portion configured to provide at least one of a curving force and a braking force to the vehicle.

Therefore, the present invention can realize the driving assist in consideration of the delay in the driver's operation regardless of the configuration of the vehicle.

DESCRIPTION OF EMBODIMENTS

First Embodiment

Figure 1:
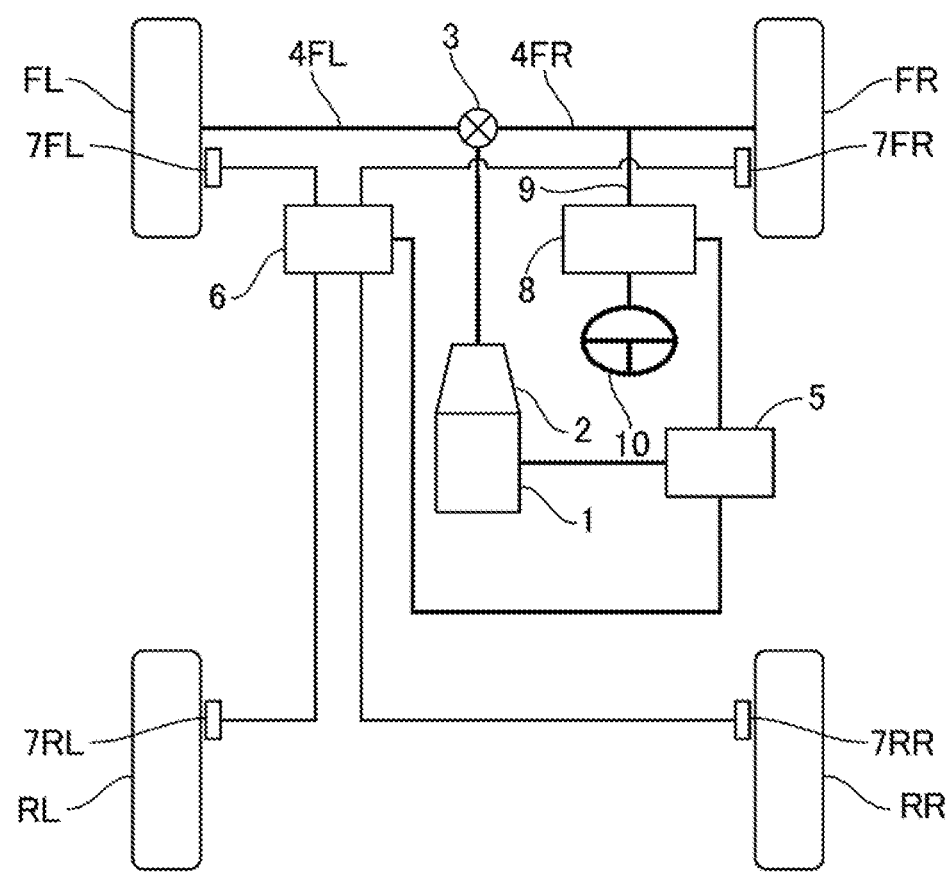
FIG. 1 illustrates a configuration of a driving assist system according to a first embodiment.

FIG. 1 illustrates a configuration of a driving assist system according to a first embodiment.

An engine (a driving apparatus) 1 is coupled with each of drive shafts (a left drive shaft 4FL and a right drive shaft 4FR) of front wheels (a front left wheel FL and a front right wheel FR) via an automatic transmission 2 and a differential gear 3. The engine 1 provides a driving torque to the front wheels FL and FR. The front wheels FL and FR are driving wheels and are also steering wheels.

A brake apparatus 6 provides a braking torque to each of the wheels (the front left wheel FL, the front right wheel FR, a rear left wheel RL, and a rear right wheel RR). Brake units (a front left brake unit 7FL, a front right brake unit 7FR, a rear left brake unit 7RL, and a rear right brake unit 7RR) including wheel cylinders are mounted on the wheels FL to RR, respectively. The brake actuation units 7FL to 7RR provide a frictional braking torque to the wheels FL to RR respectively corresponding thereto according to a wheel cylinder hydraulic pressure. The brake apparatus 6 includes two brake line systems, and a piping form thereof is an X-piping type configuration.

An electric power steering apparatus (a steering assist apparatus) 8 includes an electric motor, and outputs an assist torque for assisting a steering force of a driver to a steering shaft 9. The steering shaft 9 is coupled with each of a steering wheel 10 and a steering mechanism (not illustrated) that steers the front wheels FL and FR.

Figure 2:
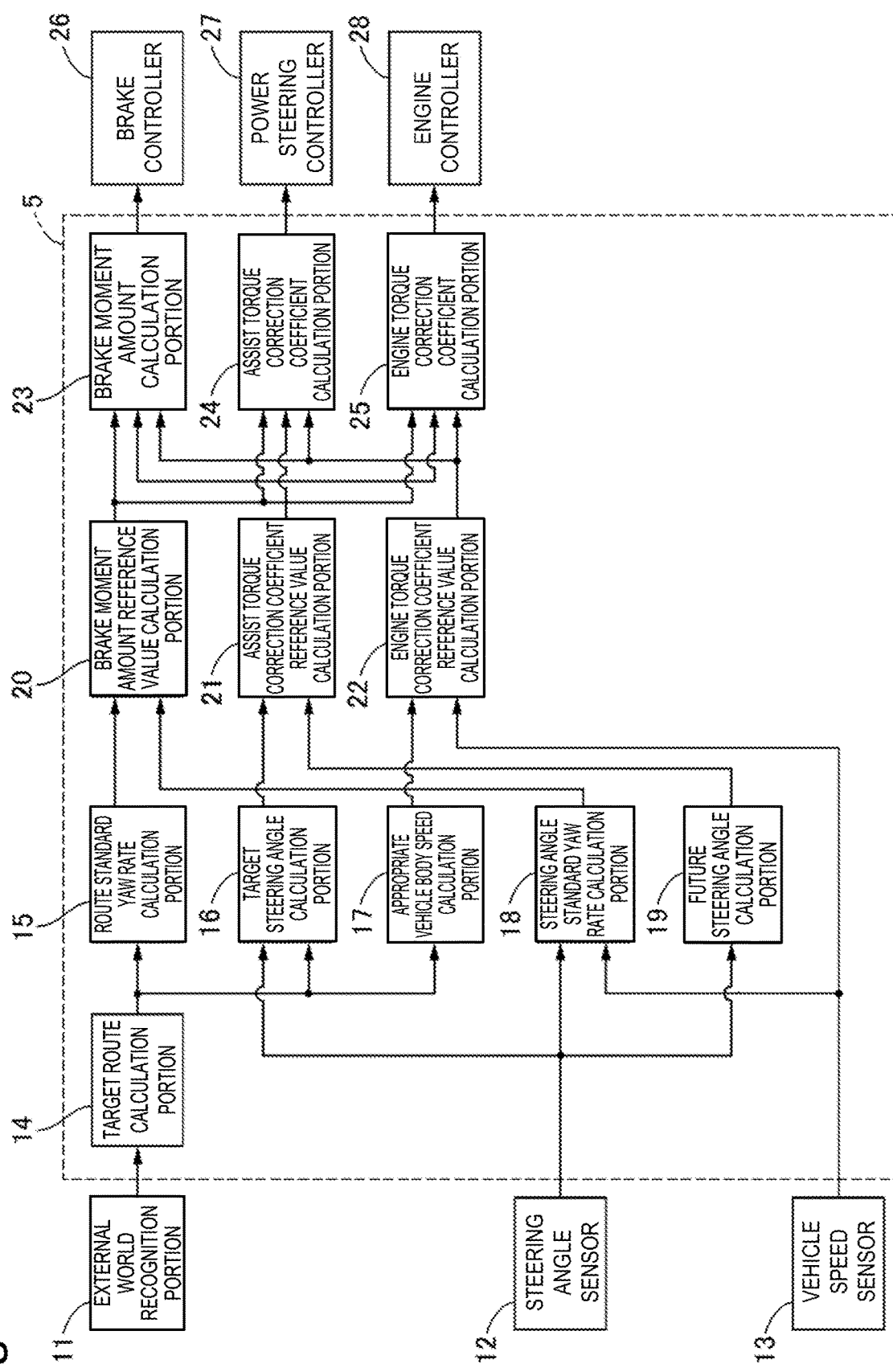
FIG. 2 is a control block diagram regarding driving assist control by a control unit 5.

A control unit 5 drives each actuator portion (the engine 1, the brake apparatus 6, and the electric power steering apparatus 8), and assists the driver's driving especially when the vehicle runs a curve (a curving road). FIG. 2 is a control block diagram regarding the driving assist control by the control unit (an actuator control output portion) 5.

An external world recognition portion 11 acquires road information ahead of the vehicle (a curvature of the road, a width of the road, an obstacle, and the like) with use of a not-illustrated in-vehicle camera, GPS, and/or map database. A steering angle sensor (a steering angle acquisition portion) 12 acquires steering angles of the front wheels FL and FR. A vehicle body speed sensor (a vehicle body speed acquisition portion) 13 acquires a vehicle body speed of the vehicle.

A target route calculation portion (a standard running route acquisition portion) 14 calculates a target route (a standard running route) of the vehicle based on the road information ahead of the vehicle. The target route is assumed to be, for example, an ideal running trajectory that a skilled driver would pass.

A route standard yaw rate calculation portion 15 calculates a route standard yaw rate, which is a yaw rate generated when the vehicle runs the target route.

A target steering angle calculation portion 16 calculates a target steering angle (a required steering angle), which is a steering angle necessary to keep the vehicle running the target route at the current vehicle body speed.

An appropriate vehicle body speed calculation portion 17 calculates an appropriate vehicle body speed, which is a vehicle body speed that allows a lateral acceleration to match or fall below a predetermined value when the vehicle runs the target route.

A steering angle standard yaw rate calculation portion 18 calculates a steering angle standard yaw rate in consideration of a transmission delay characteristic specific to the vehicle based on the current steering angle and vehicle body speed.

A future steering angle calculation portion 19 calculates a future steering angle, which is a steering angle when the vehicle will run the curve ahead of the vehicle, based on the current steering angle.

A brake moment amount reference value calculation portion 20 calculates a brake moment amount reference value, which is a reference value of a moment amount necessary to allow an actual yaw rate to match the route standard yaw rate, based on a difference between the route standard yaw rate and the steering angle standard yaw rate.

An assist torque correction coefficient reference value calculation portion 21 calculates an assist torque correction coefficient reference value, which is a reference value of an assist torque correction coefficient necessary to allow an actual steering angle to match the target steering angle, based on a difference between the target steering angle and the future steering angle.

An engine torque correction coefficient reference value calculation portion 22 calculates an engine torque correction coefficient reference value, which is a reference value of an engine torque correction coefficient necessary to allow an actual vehicle body speed to match the appropriate vehicle body speed, based on a difference between the appropriate vehicle body speed and the vehicle body speed.

A brake moment amount calculation portion 23 corrects the brake moment amount reference value based on the assist torque correction coefficient reference value and the engine torque correction coefficient reference value, thereby calculating the brake moment amount. The calculated brake moment amount is output to a brake controller 26 as a brake output instruction.

An assist torque correction coefficient calculation portion 24 corrects the assist torque correction coefficient reference value based on the brake moment amount reference value and the engine torque correction coefficient reference value, thereby calculating the assist torque correction coefficient. The assist torque correction coefficient is output to a power steering controller 27 as an assist torque output instruction.

An engine torque correction coefficient calculation portion 25 corrects the engine torque correction coefficient reference value based on the brake moment amount reference value and the assist torque correction coefficient reference value, thereby calculating the engine torque correction coefficient. The engine torque correction coefficient is output to an engine controller 28 as a torque output instruction.

The brake controller 26 provides a brake hydraulic pressure for realizing the brake moment amount to one of the rear wheels RL and RR. It is desirable to achieve the brake moment amount with use only the brake hydraulic pressure at the rear wheel RL or RR, a reason for which will be described now. Generating a difference in braking force between the rear wheels RL and RR makes it unlikely to evoke a feeling of strangeness in the driver without even a kickback that otherwise would be applied to the steering wheel 10 according to a difference in braking force between the front wheels FL and FR. Further, because a generated moment with respect to a unit braking force is larger on the rear wheel than on the front wheel for a general vehicle, the present method also allows a weaker braking force to be generated secondarily due to the generated moment, thereby being able to effectively reduce the feeling of strangeness evoked in the driver. Further, from another perspective, this method guides the vehicle to take an appropriate vehicle posture while autonomously slowing down the vehicle just before the curve, thereby being able to feel the driver safe.

The power steering controller 27 calculates an assist torque target value by multiplying the assist torque calculated according to the steering torque and the vehicle body speed by the assist torque correction coefficient, and controls the electric power steering apparatus 8 so as to achieve the assist torque target value. Calculating the assist torque target value by multiplying the assist torque by the assist torque correction coefficient prevents the assist torque in response to the steering input by the driver from being generated in a direction that does not comply with the steering intention of the driver, thereby contributing to guiding the steering angle toward the appropriate steering angle according to the target route while reducing the feeling of strangeness evoked when the driver operates the steering wheel. The steering torque is detected by a not-illustrated torque sensor mounted on the steering shaft 9.

The engine controller 28 calculates an engine torque target value by multiplying the engine torque calculated according to an accelerator position by the engine torque correction coefficient, and controls the engine 1 so as to realize the engine torque target value. Calculating the engine torque target value by multiplying the engine torque by the engine torque correction coefficient prevents the vehicle body speed from changing in response to the driver's accelerator operation in a direction that does not comply with the driver's acceleration intension, thereby contributing to realizing an appropriate vehicle body speed according to the target route while reducing the feeling of strangeness evoked due to the control intervention in the driver.

Figure 3:
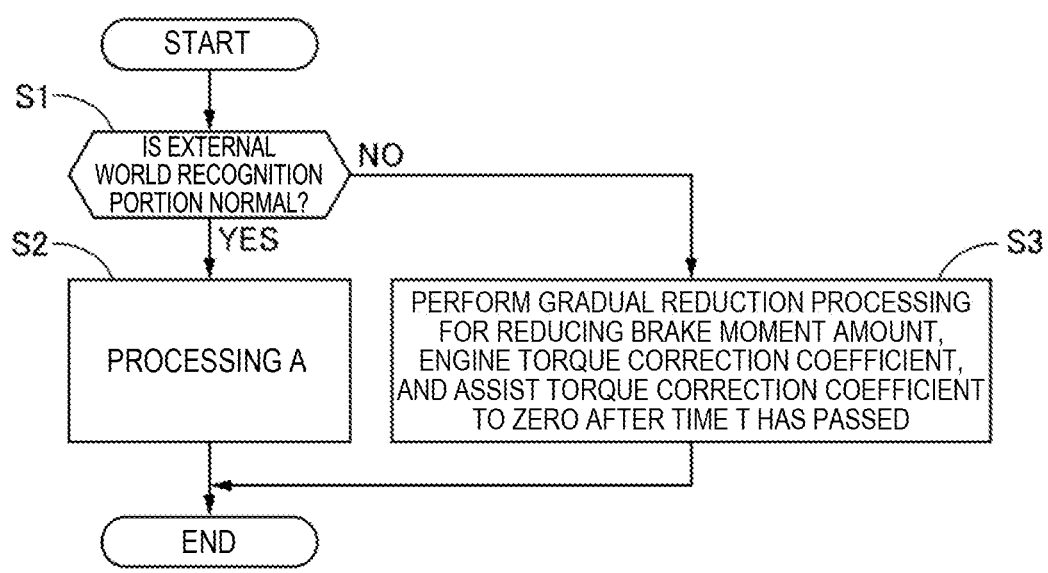
FIG. 3 is a flowchart illustrating driving assist control processing by the control unit 5.

FIG. 3 is a flowchart illustrating driving assist control processing by the control unit 5.

In step S1, the control unit 5 determines whether the external world recognition portion 11 is normal. If the determination in step S1 is YES, the processing proceeds to step S2. If the determination in step S1 is NO, the processing proceeds to step S3.

In step S2, the control unit 5 performs processing that should be performed when the external world recognition portion 11 is normal. Details thereof will be described below.

In step S3, the control unit 5 performs processing that should be performed when the external world recognition portion 11 is not normal (a failure has occurred therein). More specifically, the control unit 5 performs gradual reduction processing in such a manner that the brake moment amount, the engine torque correction coefficient, and the assist torque correction coefficient reduce to zero after a predetermined time t has passed.

Figure 4:
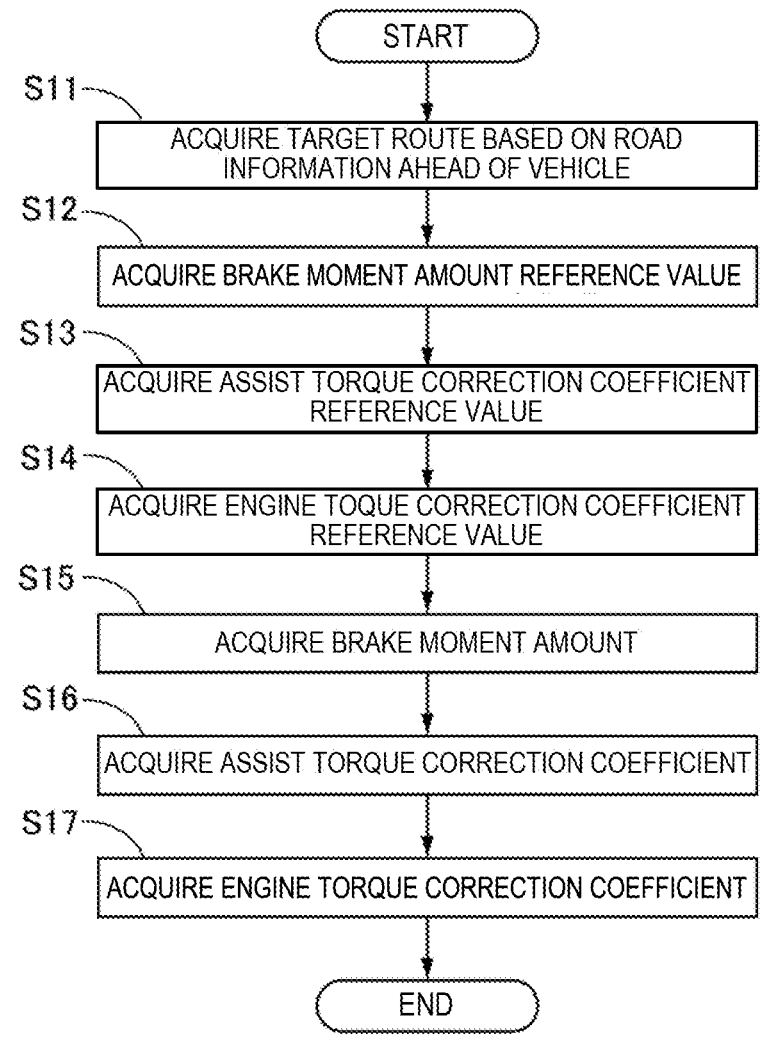
FIG. 4 is a flowchart illustrating processing in step S2 illustrated in FIG. 3.

FIG. 4 is a flowchart illustrating the processing in step S2 illustrated in FIG. 3.

In step S11, the target route calculation portion 14 calculates the ideal target route that, for example, the skilled driver would pass based on the road information ahead of the vehicle (the curvature of the road, the width of the road, the obstacle, and the like).

In step S12, the brake moment amount reference value calculation portion 20 calculates the brake moment amount reference value.

In step S13, the assist torque correction coefficient reference value calculation portion 21 calculates the assist torque correction coefficient reference value.

In step S14, the engine torque correction coefficient reference value calculation portion 22 calculates the engine torque correction coefficient reference value.

In step S15, the brake moment amount calculation portion 23 calculates the brake moment amount.

In step S16, the assist torque correction coefficient calculation portion 24 calculates the assist torque correction coefficient.

In step S17, the engine torque correction coefficient calculation portion 25 calculates the engine torque correction coefficient.

Figure 5:
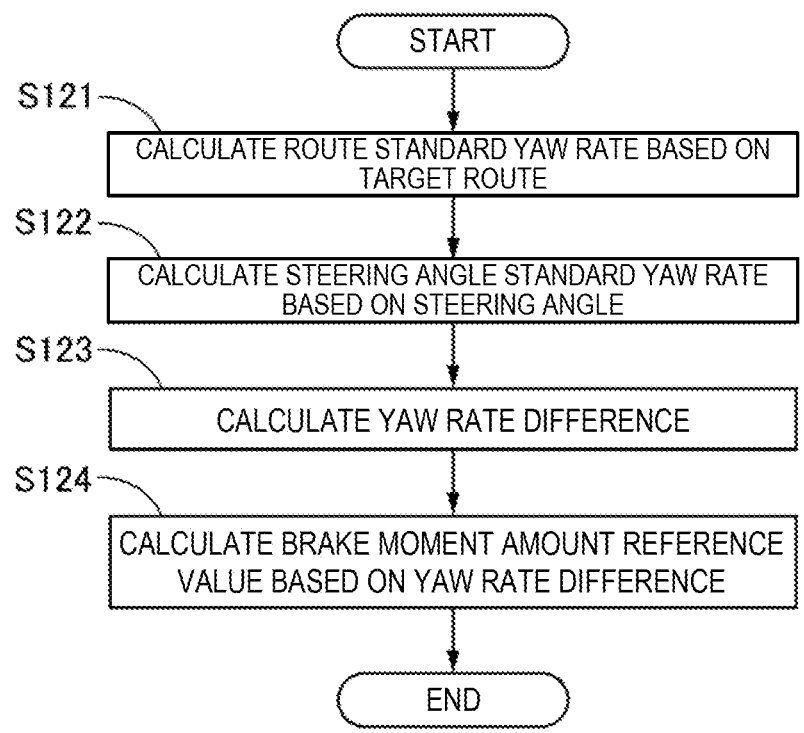
FIG. 5 is a flowchart illustrating processing in step S12 illustrated in FIG. 4.

FIG. 5 is a flowchart illustrating the processing in step S12 illustrated in FIG. 4.

In step S121, the route standard yaw rate calculation portion 15 calculates the route standard yaw rate. A route standard yaw rate γcourse can be calculated by, for example, multiplying a curvature κcourse of the route ahead of the vehicle by a vehicle body speed V.

$$\gamma course = V \times \kappa course$$

In step S122, the steering angle standard yaw rate calculation portion 18 calculates a steering angle standard yaw rate γstr with use of the following equation based on a current steering angle δdriver.

$$\frac{\gamma_{str}(s)}{\delta_{driver}(S)} = \frac{2mVK_f l_f S + 4K_f K_r (l_f + l_r)}{mVlS^2 + \{2m(K_f l_f^2 + K_r l_r^2) + 2l(K_f + K_r)\}S + \left\{\frac{4K_f K_r}{V}(l_f + l_r)^2 - 2mV(K_f l_f - K_r l_r)\right\}}$$ [Equation 1]

In this equation, m represents a vehicle mass, V represents the vehicle body speed, Kf represents cornering power at the front wheel, Kr represents cornering power at the rear wheel, lf represents a distance between a center of gravity and a front axle, lr represents a distance between the center of gravity and a rear axle, I represents a vehicle inertia, and S represents a Laplace operator.

In step S123, the brake moment amount reference value calculation portion 20 calculates a yaw rate difference Δγ with use of the following equation based on the route standard yaw rate γcourse and the steering angle standard yaw rate γstr.

$$\Delta\gamma = \gamma course - \gamma str$$

In step S124, the brake moment amount reference value calculation portion 20 calculates a brake moment amount reference value Brake_Moment_ref with use of the following equation based on the yaw rate difference Δγ.

$$\text{Brake\_Moment\_ref} = \frac{2K_f K_r l^2 - (K_f l_f - K_r l_r)mV^2}{K_f + K_r} \cdot \frac{\Delta\gamma}{V}$$ [Equation 2]

Generally, a yaw rate (the steering angle standard yaw rate) is generated on the vehicle while being accompanied by a transmission characteristic specific to the vehicle after the driver operates the steering wheel. In other words, the steering should be started in advance in consideration of the transmission delay characteristic specific to the vehicle to trace the target route. In step S12, the brake moment amount reference value Brake_Moment_ref necessary to allow the actual yaw rate to match the route standard yaw rate is calculated, when a difference is confirmed between the steering angle standard yaw rate and the route standard yaw rate due to a delay in the driver's operation of the steering wheel, exceedance or insufficiency of the steering amount, or the like. The moment is provided based on the difference between the left and right braking forces in the first embodiment, but may be realized based on steering on the rear wheel or the like. However, active control of the steering angle so as to cause the steering wheel 10 to operate by itself is not performed because this leads to an operation that does not comply with the driver's steering intention.

Figure 6:
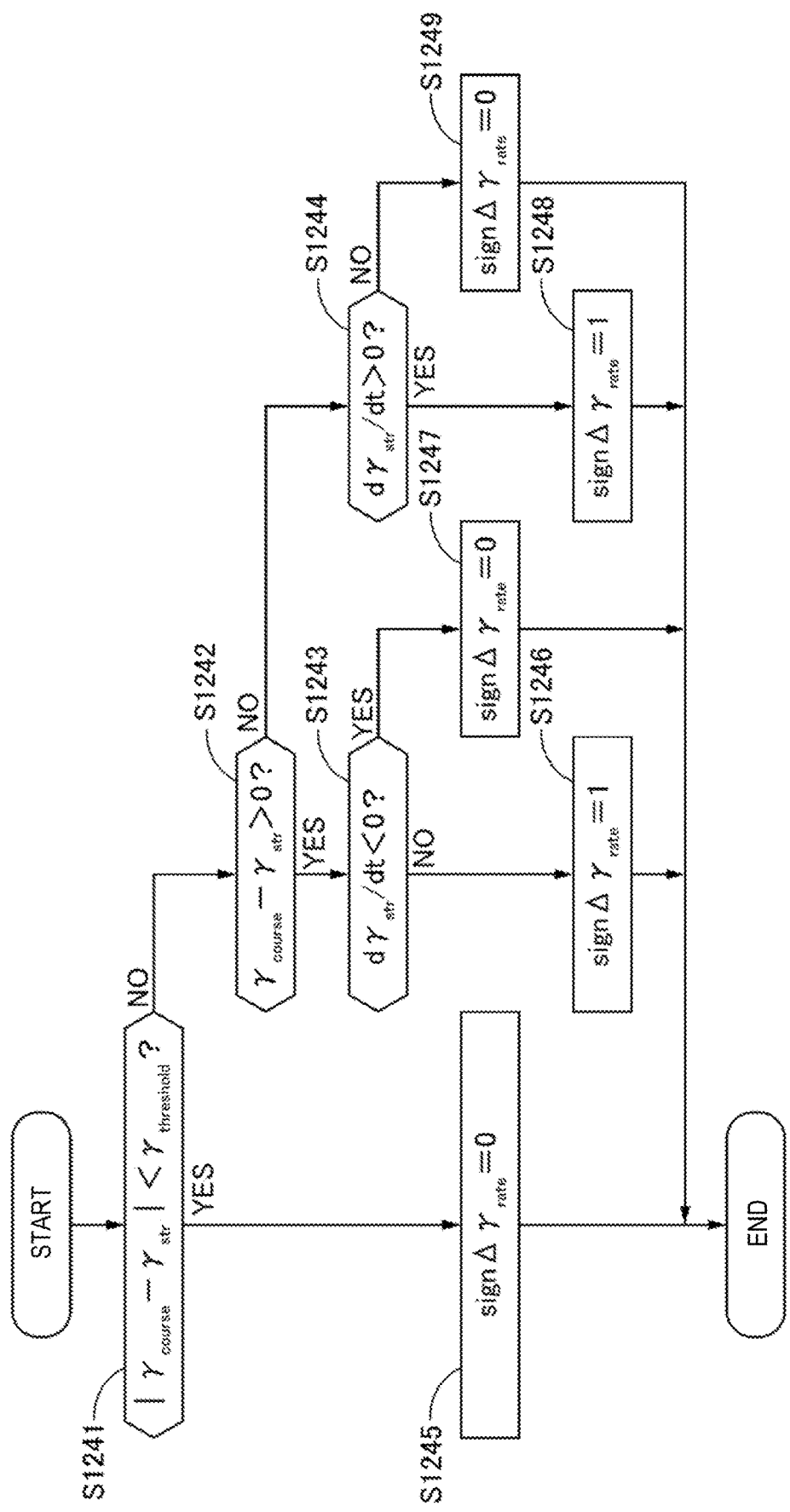
FIG. 6 is a flowchart illustrating a method for correcting a brake moment reference value.

The brake moment amount reference value calculation portion 20 can also differentiate the steering angle standard yaw rate γstr, calculate signΔγrate according to the flowchart illustrated in FIG. 6, and correct the brake moment amount reference value Brake_Moment_ref with use of the following equation in step S124 illustrated in FIG. 5.

$$\text{Brake\_Moment\_ref}^* = \text{Brake\_Moment\_ref} \times \text{sign}\Delta\gamma\text{rate}$$

In step S1241, the brake moment amount reference value calculation portion 20 determines whether an absolute value of a value acquired by subtracting the steering angle standard yaw rate γstr from the route standard yaw rate γcourse (the yaw rate difference Δγ) is smaller than a threshold value ythreshold. If the determination in step S1241 is YES, the processing proceeds to step S1245. If the determination in step S1241 is NO, the processing proceeds to step S1242.

In step S1242, the brake moment amount reference value calculation portion 20 determines whether the value acquired by subtracting the steering angle standard yaw rate γstr from the route standard yaw rate γcourse is larger than zero. If the determination in step S1242 is YES, the processing proceeds to step S1243. If the determination in step S1242 is NO, the processing proceeds to step S1244.

In step S1243, the brake moment amount reference value calculation portion 20 determines whether a differential value γstr/dt of the steering angle standard yaw rate γstr is smaller than zero. If the determination in step S1243 is YES, the processing proceeds to step S1246. If the determination in step S1243 is NO, the processing proceeds to step S1247.

In step S1244, the brake moment amount reference value calculation portion 20 determines whether the differential value γstr/dt of the steering angle standard yaw rate γstr is larger than zero. If the determination in step S1244 is YES, the processing proceeds to step S1248. If the determination in step S1244 is NO, the processing proceeds to step S149.

In step S1245, the brake moment amount reference value calculation portion 20 sets signΔγrate to zero.

In step S1246, the brake moment amount reference value calculation portion 20 sets signΔγrate to one.

In step S1247, the brake moment amount reference value calculation portion 20 sets signΔγrate to zero.

In step S1248, the brake moment amount reference value calculation portion 20 sets signΔγrate to one.

In step S1249, the brake moment amount reference value calculation portion 20 sets signΔγrate to zero.

In other words, the driving assist system limits the provision of the brake moment when the driver is operating the steering wheel 10 in a direction for making the steering angle farther away from the target steering angle, while actively assisting the driving when the driver is operating the steering wheel 10 in a direction for making the steering angle closer to the target steering angle. As a result, the driving assist system can assist the driving only when the driver's steering intention and the operation that the driving assist system deems physically appropriate match each other. The route standard yaw rate generated by the driving assist system does not necessarily match the driver's intension. Therefore, when the route standard yaw rate does not match the driver's intension, the driving assist system limits the provision of the brake moment, thereby being able to reduce the feeling of strangeness evoked in the driver.

Figure 7:
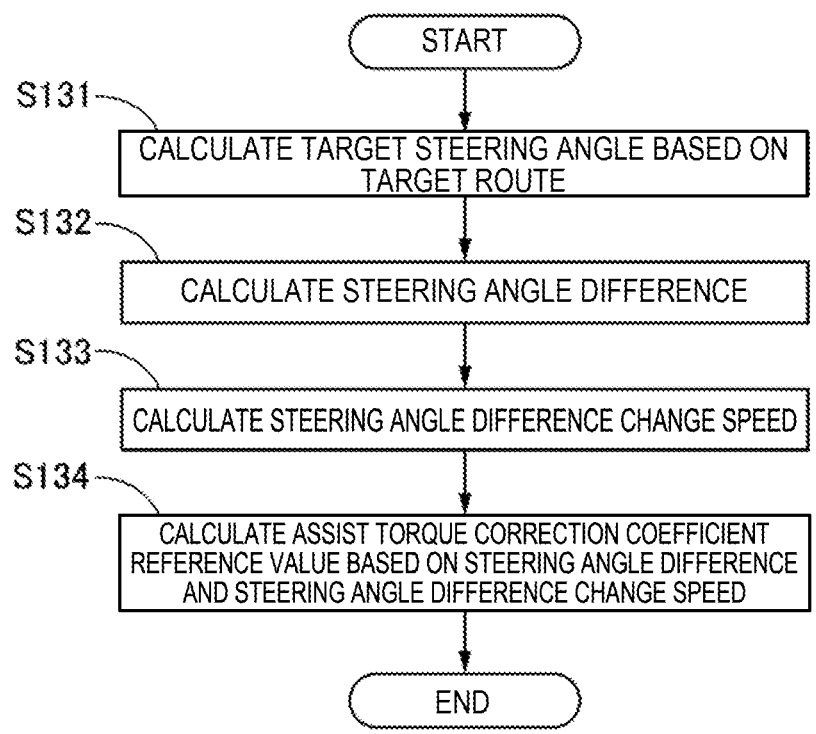
FIG. 7 is a flowchart illustrating processing in step S13 illustrated in FIG. 4.

FIG. 7 is a flowchart illustrating the processing in step S13 illustrated in FIG. 4.

In step S131, the target steering angle calculation portion 16 calculates the target steering angle δdriver with use of the following equation.

$$\frac{\delta_{conrse}(S)}{\gamma_{conrse}(s)} = \frac{mVlS^2 + \{2m(K_f l_f^2 + K_r l_r^2) + 2l(K_f + K_r)\}S + \left\{\frac{4K_f K_r}{V}(l_f + l_r)^2 - 2mV(K_f l_f - K_r l_r)\right\}}{2mVK_f l_f S + 4K_f K_r (l_f + l_r)}$$ [Equation 3]

In step S132, the assist torque correction coefficient reference value calculation portion 21 calculates a steering angle difference Δδ with use of the following equation based on a target steering angle δdriver and a future steering angle δcourse.

Δδ=δdriver−δcourse

In step S133, the assist torque correction coefficient reference value calculation portion 21 calculates a steering angle difference change speed Δδrate, which is a differential value of the steering angle difference Δδ.

Δδrate=dΔδ/dt

In step S134, the assist torque correction coefficient reference value calculation portion 21 calculates the assist torque correction coefficient reference value based on the steering angle difference Δδ and the steering angle difference change speed Δδrate.

Figure 8:
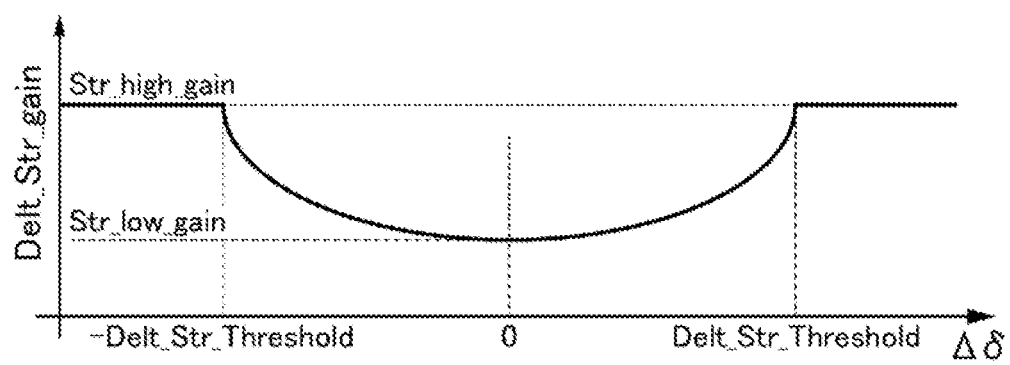
FIG. 8 is a map for calculating an assist torque correction coefficient provisional value 1.

First, the assist torque correction coefficient reference value calculation portion 21 calculates an assist torque correction coefficient provisional value 1 (Delt_Str_gain) by referring to a map illustrated in FIG. 8 based on the steering angle difference Δδ. The map illustrated in FIG. 8 may be set arbitrary, but a maximum value Str_high_gain is set to a value equal to or larger one, and Str_low_gain is set to a value larger than zero and smaller than one. Further, the map illustrated in FIG. 8 is set in such a manner that the assist torque correction coefficient provisional value 1 reduces as Δδ becomes closer to zero.

Subsequently, the assist torque correction coefficient reference value calculation portion 21 acquires an assist torque correction coefficient provisional value 2 (Delt_Str_rate_gain) by referring to a map illustrated in FIG. 9 based on the steering angle difference change speed Δδrate. The map illustrated in FIG. 9 may be set arbitrarily, but it is desirable that the assist torque correction coefficient provisional value 2 (Delt_Str_rate_gain) is set to one when Δδrate is zero. Further, it is desirable that the assist torque correction coefficient provisional value 2 (Delt_Str_rate_gain) is set to a value equal to or larger than one when Δδrate is a negative value, i.e., the steering wheel 10 is operated in the direction approaching the target steering angle, and is set to a value equal to or smaller than one when Δδrate is a positive value, i.e., the steering wheel 10 is operated in the direction deviating from the target steering angle.

Next, the assist torque correction coefficient reference value calculation portion 21 selects smaller one of the assist torque correction coefficient provisional value 1 (Delt_Str_rate_gain) and the assist torque correction coefficient provisional value 2 (Delt_Str_rate_gain), and sets the selected one as the assist torque correction coefficient reference value Str_gain. As a result, when the actual steering angle is controlled toward the target steering angle δdriver in a state far from the target steering wheel, the assist torque correction coefficient reference value Str_gain increases, and successively reduces as the actual steering angle is becoming closer to the target steering angle δdriver. Further, when the actual steering angle shifts in the direction deviating from the target steering angle δdriver, the actual steering angle is guided toward the target steering angle δdriver by reducing the assist torque correction coefficient reference value Str_gain.

Figure 9:
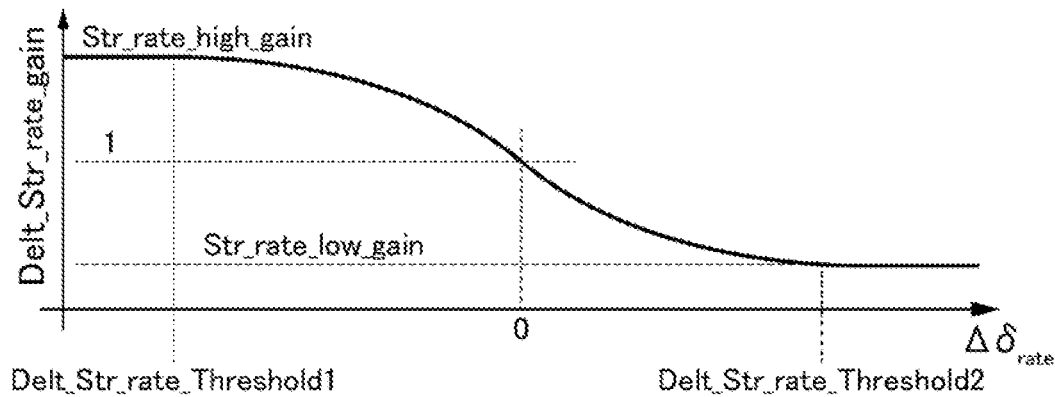
FIG. 9 is a map for calculating an assist torque correction coefficient provisional value 2.

Further, for example, Str_low_gain and Str_rate_low_gain illustrated in FIGS. 8 and 9 may be set to one or a value close to one. In this case, the assist torque correction coefficient reference value calculation portion 21 is supposed to actively assist the driving when the driver is operating the steering wheel in the direction for making the actual steering angle closer to the target steering angle δdriver, while refraining from actively correcting the normal assist torque control when the driver is operating the steering wheel in the direction for making the actual steering angle farther away from the target steering angle δdriver. As a result, the driving assist system assists the driving only when the driver's steering intention and the operation that the driving assist system deems physically appropriate match each other. The target steering angle δdriver does not necessarily match with the driver's intension, and therefore the driving assist system can reduce the feeling of strangeness evoked in the driver when they do not match each other.

An appropriate lateral force should be continuously applied to the vehicle to allow the vehicle to keep running the target route. In other words, because the source of the lateral force is the steering angle, the actual steering angle should constantly match the target steering angle δdriver to allow the vehicle to keep running the target route. However, similarly to the above description, the lateral force is generated on the vehicle while being accompanied by the transmission delay characteristic specific to the vehicle after the driver operates the steering wheel. Therefore, when a curve or the like lies ahead, the steering should be started in advance just before the curve in consideration of the transmission delay characteristic specific to the vehicle. In step S13, the assist torque correction coefficient reference value Str_gain that adjusts the assist torque in the direction for guiding the actual steering angle toward the target steering angle δdriver is calculated, when a difference is confirmed between the future steering angle according to the amount of the driver's operation of the steering wheel 10 and the target steering angle δdriver.

Figure 10:
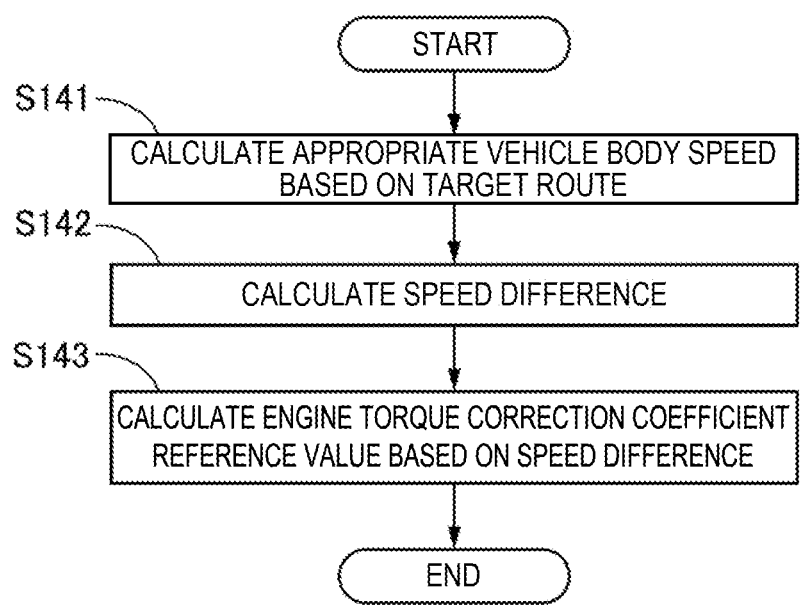
FIG. 10 is a flowchart illustrating processing in step S14 illustrated in FIG. 4.

FIG. 10 is a flowchart illustrating the processing in step S14 illustrated in FIG. 4.

In step S141, the appropriate vehicle body speed calculation portion 17 calculates an appropriate vehicle body speed Vref for allowing the vehicle to run with a lateral acceleration equal to or lower than a lateral acceleration upper limit value YGlimit on the running route ahead of the vehicle with use of the following equation, based on the preset lateral acceleration upper limit value YGlimit and the curvature information course of the target route.

$$V_{ref} = \sqrt{\frac{YG_{limit}}{\kappa_{course}}}$$ [Equation 4]

In step S142, the engine torque correction coefficient reference value calculation portion 22 calculates a speed difference ΔV with use of the following equation based on the current vehicle body speed V and the appropriate vehicle body speed Vref.

$$\Delta V = V - V\text{ref}$$

Figure 11:
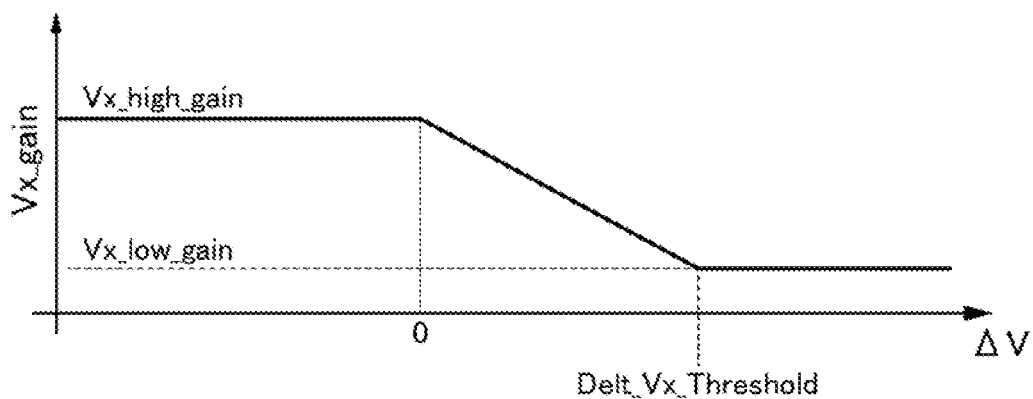
FIG. 11 is a map for calculating an engine torque correction coefficient reference value.

In step S143, the engine torque correction coefficient reference value calculation portion 22 calculates an engine torque correction coefficient reference value Vx_gain by referring to a map illustrated in FIG. 11 based on the speed difference ΔV. The map illustrated in FIG. 11 may be set arbitrarily, but it is desirable that vx_high_gain is set to one when the lateral acceleration generated on the vehicle does not reach the lateral acceleration upper limit value YGlimit even when ΔV is zero or smaller, i.e., the vehicle keeps running at the current vehicle body speed V. It is desirable that vx_low_gain is set to zero or larger and smaller than one when ΔV is a positive value, i.e., the lateral acceleration generated on the vehicle exceeds the lateral acceleration upper limit value YGlimit.

In step S14, if the current vehicle body speed V is higher than the appropriate vehicle body speed Vref, the appropriate vehicle body speed calculation portion 17 calculates an engine torque correction coefficient reference value Vx_gain so as to correct the engine torque amount with respect to the amount of the driver's operation of the accelerator into a smaller amount than normal, thereby prohibiting speed exceedance more than that.

Figure 12:
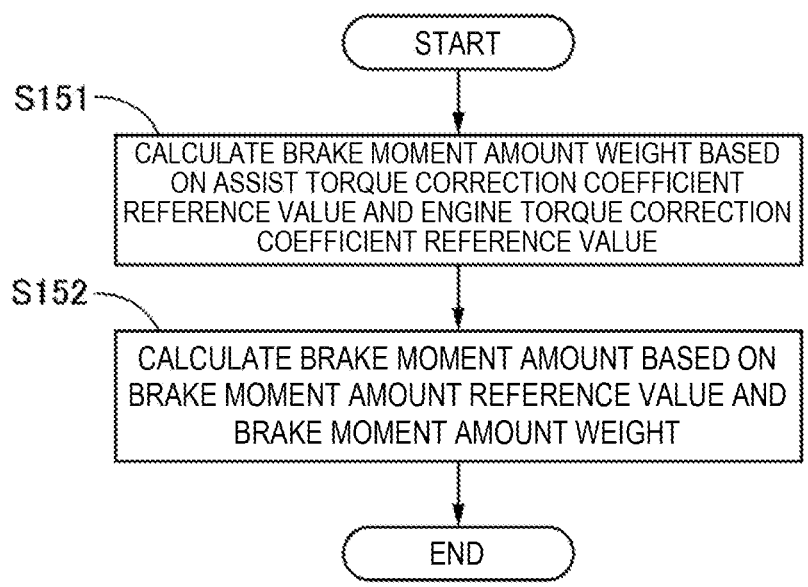
FIG. 12 is a flowchart illustrating processing in step S15 illustrated in FIG. 4.

FIG. 12 is a flowchart illustrating the processing in step S15 illustrated in FIG. 4.

Figure 13:
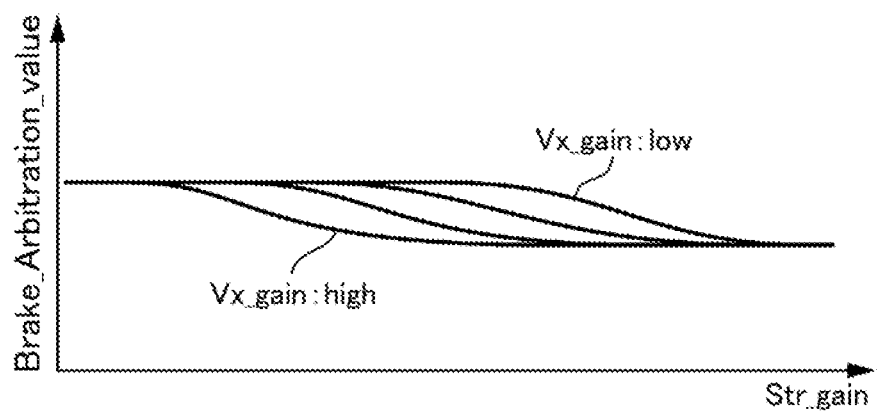
FIG. 13 is a map for calculating a brake moment amount weight.

In step S151, the brake moment amount calculation portion 23 calculates a brake moment amount weight Brake_Arbitration_value(0 to 1) by referring to a map illustrated in FIG. 13 based on the assist torque correction coefficient reference value Str_gain and the engine torque correction coefficient reference value Vx_gain. In the map illustrated in FIG. 13, Brake_Arbitration_value reduces as Str_gain or Vx_gain increases.

In step S152, the brake moment amount calculation portion 23 calculates the brake moment amount by multiplying the brake moment amount reference value Brake_Moment_ref by the brake moment amount weight Brake_Arbitration_value.

Correcting the assist torque and the vehicle body speed in addition to the brake may end up in excessive control, and therefore the excessive control can be prevented by assigning a weight to the brake moment amount reference value Brake_Moment_ref based on the assist torque correction coefficient reference value Str_gain and the engine torque correction coefficient reference value Vx_gain.

Figure 14:
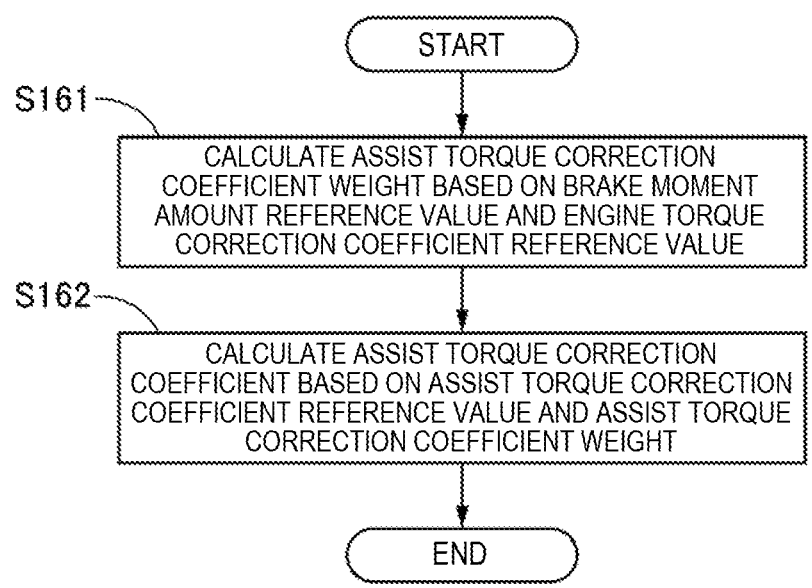
FIG. 14 is a flowchart illustrating processing in step S16 illustrated in FIG. 4.

FIG. 14 is a flowchart illustrating the processing in step S16 illustrated in FIG. 4.

Figure 15:
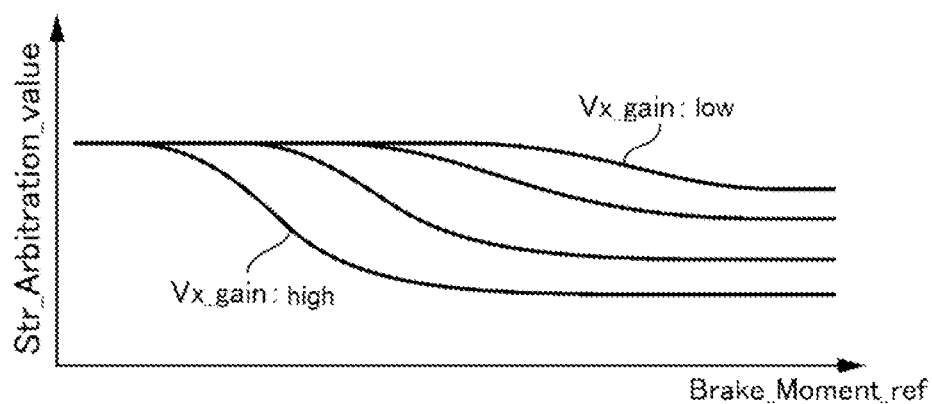
FIG. 15 is a map for calculating an assist torque correction coefficient weight.

In step S161, the assist torque correction coefficient calculation portion 24 calculates an assist torque correction coefficient weight Str_Arbitration_value (0 to 1) by referring to a map illustrated in FIG. 15 based on the brake moment amount reference value Brake_Moment_ref and the engine torque correction coefficient reference value Vx_gain. In the map illustrated in FIG. 15, Str_Arbitration_value reduces as Brake_Moment_ref or Vx_gain increases.

In step S162, the assist torque correction coefficient calculation portion 24 calculates the assist torque correction coefficient by multiplying the assist torque correction coefficient reference value Str_gain by the assist torque correction coefficient weight Str_Arbitration_value.

Correcting the brake and the vehicle body speed in addition to the assist toque may end up in excessive control, and therefore the excessive control can be prevented by assigning a weight to the assist torque correction coefficient reference value Str_gain based on the brake moment amount reference value Brake_Moment_ref and the engine torque correction coefficient reference value Vx_gain.

Figure 16:
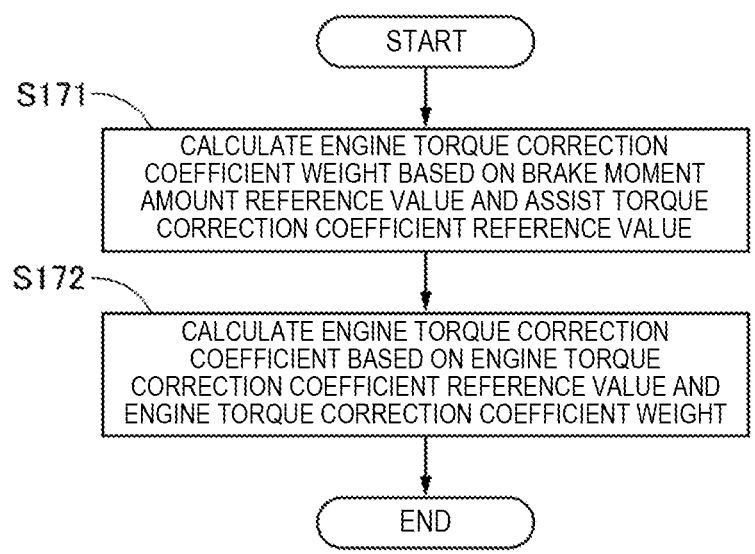
FIG. 16 is a flowchart illustrating processing in step S17 illustrated in FIG. 4.

FIG. 16 is a flowchart illustrating the processing in step S17 illustrated in FIG. 4.

Figure 17:
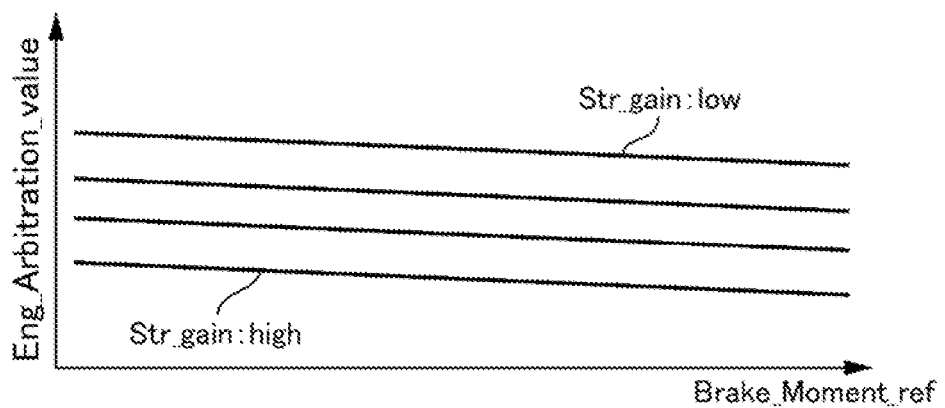
FIG. 17 is a map for calculating an engine torque correction coefficient weight.

In step S171, the engine torque correction coefficient calculation portion 25 calculates an engine torque correction coefficient weight Eng_Arbitration_value (0 to 1) by referring to a map illustrated in FIG. 17 based on the brake moment amount reference value Brake_Moment_ref and the assist torque correction coefficient reference value Str_gain. In the map illustrated in FIG. 17, Eng_Arbitration_value reduces as Brake_Moment_ref or Str_gain increases.

In step S172, the engine torque correction coefficient calculation portion 25 calculates the engine torque correction coefficient by multiplying the engine torque correction coefficient reference value Vx_gain by the engine torque correction coefficient weight Eng_Arbitration_value.

Correcting the brake and the assist torque in addition to the vehicle body speed may end up in excessive control, and therefore the excessive control can be prevented by assigning a weight to the engine torque correction coefficient reference value Vx_gain based on Brake_Moment_ref and the assist torque correction coefficient reference value Str_gain.

Next, advantageous effects of the first embodiment will be described.

Figure 18:
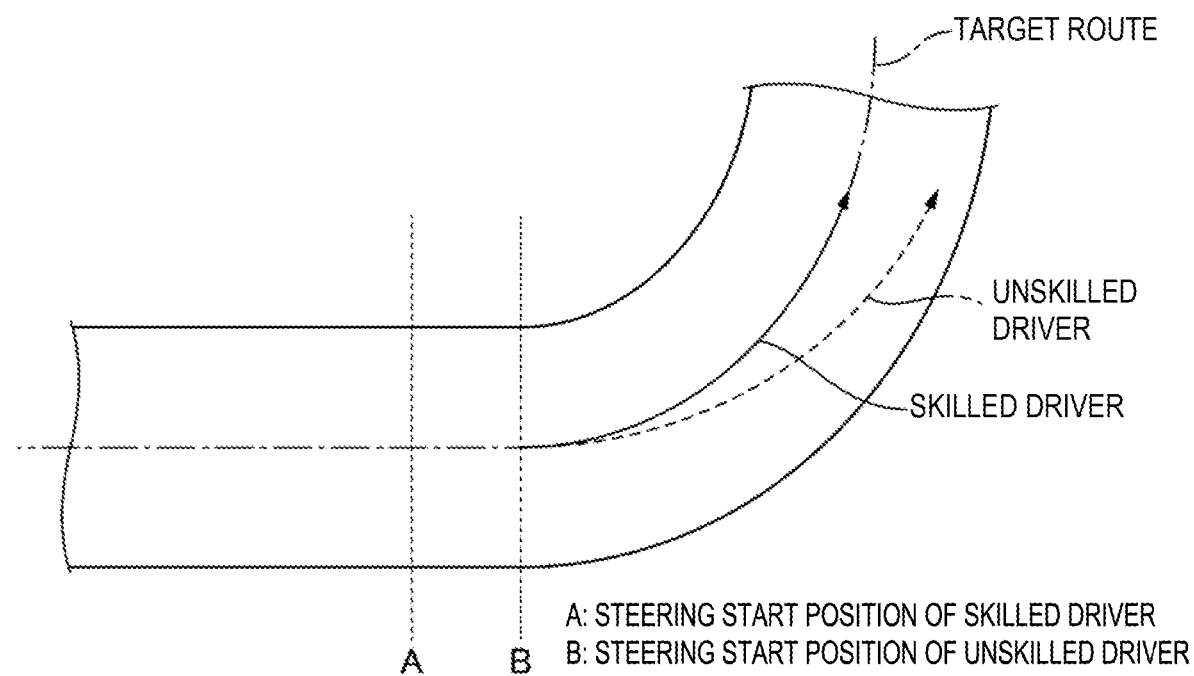
FIG. 18 illustrates running trajectories at a curve when a skilled driver and an unskilled driver drive the same vehicle.
Figure 19:
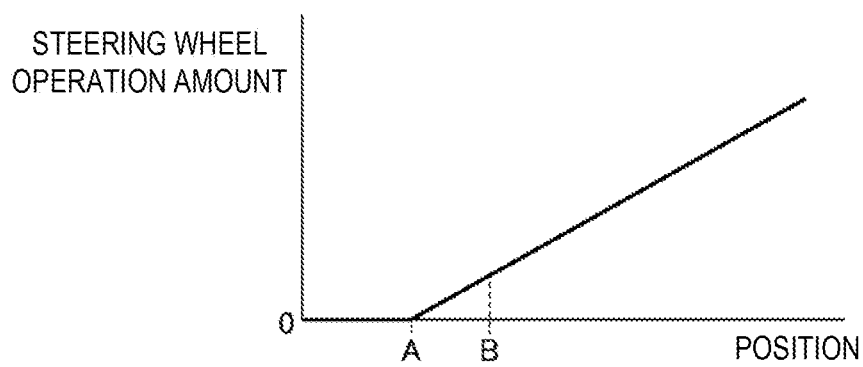
FIG. 19 illustrates a steering characteristic of the skilled driver.

FIG. 18 illustrates running trajectories at a curve when a skilled driver and an unskilled driver drive the same vehicle.

In a curving motion of the vehicle, a response delay always occurs behind the operation input to the steering wheel. The degree of this response delay is a characteristic specific to the vehicle, and complicatedly varies depending on the input speed and the vehicle body speed. The skilled driver can estimate the response delay of the vehicle accurately based on his/her long driving experience. Therefore, the skilled driver starts steering the vehicle at a position A just before a curve start position B in consideration of the response delay as illustrated in FIG. 9. Due to this operation, the vehicle can be moved as imaged along the curve shape with a minimum and mild operation of the steering wheel. As a result, the vehicle can reduce the generated lateral acceleration and yaw rate, thereby realizing a stable curving behavior from which a passenger unlikely gets carsickness. Further, an excessive load is not imposed on the tire, too.

Figure 20:
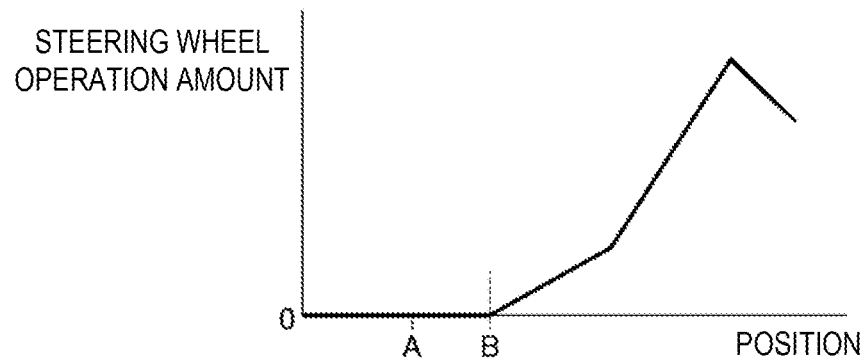
FIG. 20 illustrates a steering characteristic of the unskilled driver.

On the other hand, the unskilled driver starts steering the vehicle at the curve start position B as illustrated in FIG. 20, because failing to take the response delay of the vehicle into consideration. In other words, the unskilled driver starts steering the vehicle at the curve at a timing later than the skilled driver. Therefore, the running trajectory when the unskilled driver drives the vehicle unintentionally shifts to an outer side of the curve with respect to the target route (the running route when the skilled driver drives the vehicle). The unskilled driver additionally steers the steering wheel at a further higher speed during the operation of additionally steering the steering wheel to correct this shift, but the sudden operation of the steering wheel leads to generation of an excessive lateral acceleration and yaw rate, and also creates a significant load on the tire. Further, when an overshoot occurs due to the sudden operation of the steering wheel, this necessitates corrective steering for steering back the steering wheel and serves as a cause for a wobble of the vehicle.

On the other hand, in the driving assist control according to the first embodiment, the control unit 5 calculates the target route based on the information about the curve ahead of the vehicle that is acquired with use of the in-vehicle camera, the GPS, or the map database, and calculates the brake moment amount for eliminating the difference (the yaw rate difference $\Delta\gamma$) between the route standard yaw rate $\gamma$course and the steering angle standard yaw rate $\gamma$str based on the driver's operation of the steering wheel that is generated when the vehicle runs the target route.

The brake controller 26 provides the brake hydraulic pressure for realizing the brake moment amount to the rear wheel RL or RR. Therefore, the driving assist system can realize the driving assist for compensating for the delay in the driver's operation with the aid of the brake moment. Further, the camera, the navigation camera, and the sideslip prevention device are in widespread use, and therefore the driving assist according to the first embodiment can be employed for most vehicles regardless of the configuration of the vehicle.

Figure 21:
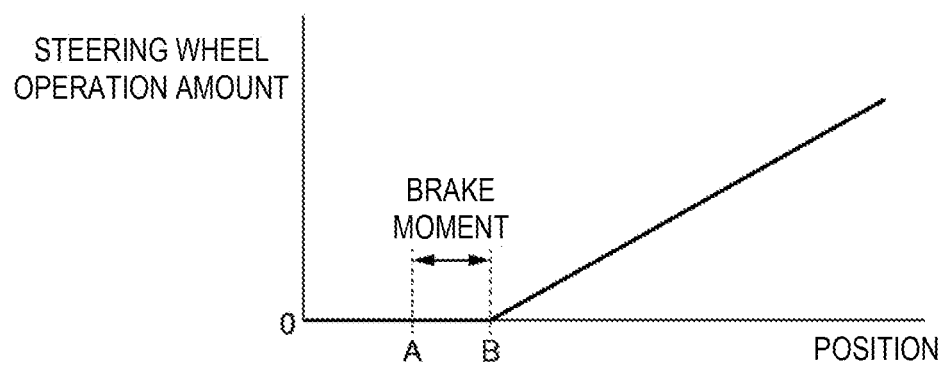
FIG. 21 illustrates a steering characteristic of the unskilled driver when the driving assist control according to the first embodiment is employed.

In a case where the driving assist control according to the first embodiment is applied to the case illustrated in FIG. 18, when the vehicle enters the curve and runs in a curving manner after running straight on the straight road, the braking torque is provided to one of the rear wheels RL and RR of the vehicle and the yaw moment is generated on the vehicle in a section from the position A to the curve start position B at which the driver starts steering the vehicle if the vehicle has not been steered via the steering wheel 10 at the position A on the straight road immediately before the entry to the curve. As a result, even when the unskilled driver steers the vehicle without taking the response delay of the vehicle into consideration as illustrated in FIG. 21, line traceability and a curving behavior similar to when the skilled driver drives the vehicle can be achieved.

A scene in which the driving assist is necessary at the time of running the curve is when the curvature of the curve is larger than expected for the driver and the vehicle reaches the curve while somewhat overspeeding. The conventional driving assist provides the yaw moment to the vehicle based on generation of a difference in driving force on the left and right wheels, i.e., so-called torque vectoring, but the torque vectoring can be effective only while the vehicle is accelerating and therefore it is impractical to actively perform an acceleration operation in the above-described scene. The driving assist according to the first embodiment is designed to provide the yaw moment while slowing down the vehicle, and is therefore more highly practical compared to the conventional driving assist.

Further, conventionally, the recognition of the external world with use of the GPS or the map database has been known, but it is impossible to assist the driving for a quick driving operation for avoiding a nearby vehicle or an obstacle lying ahead with use of only static road information such as the map. The driving assist according to the first embodiment generates the target route with use of dynamic road information using the in-vehicle camera, thereby being able to realize appropriate driving assist even at the time of emergency avoidance, which most urgently requires the driving assist for the driver.

The brake controller 26 generates the brake yaw moment on the vehicle by providing the braking torque on one of the rear wheels RL and RR. The feeling of strangeness toward the pedal due to the driver's overriding the brake can be reduced by releasing one of the two brake lines in advance during the driving assist control.

The control unit 5 calculates the assist torque correction coefficient for eliminating the difference (the steering angle difference $\Delta\delta$) between the target steering angle $\delta$driver necessary to allow the vehicle to keep running the target route at the current vehicle body speed, and the future steering angle $\delta$course when the vehicle will run the curve ahead of the vehicle based on the current steering angle. The power steering controller 27 calculates the assist torque target value by multiplying the assist torque by the assist torque correction coefficient, thereby controlling the electric power steering apparatus 8. Therefore, the driving assist system can realize the driving assist that compensates for the delay in the driver's operation with the aid of the assist torque.

The control unit 5 calculates the engine torque correction coefficient for eliminating the difference (the speed difference $\Delta V$) between the current vehicle body speed V and the appropriate vehicle body speed Vref at which the lateral acceleration matches or falls below the predetermined value when the vehicle runs the target route. The engine controller 28 calculates the engine torque target value by multiplying the engine torque by the engine torque correction coefficient, thereby controlling the engine 1. Therefore, the driving assist system can realize the driving assist that compensates for the delay in the driver's operation by reducing the engine torque.

The control unit 5 performs the gradual reduction processing so as to reduce the brake moment amount, the engine torque correction coefficient, and the assist torque correction coefficient to zero after the predetermined time t has passed, when a failure has occurred in the external world recognition portion 11. Due to this control, the driving assist system can prevent occurrence of a sudden output change toward the vehicle behavior and the driver.

The control unit 5 sets the brake moment amount to zero and refrains from outputting the instruction to the brake controller 26, when the difference between the route standard yaw rate $\gamma$course and the steering angle standard yaw rate $\gamma$str (the yaw rate difference $\Delta\gamma$) is zero. In other words, when the driving operation is appropriately performed, the driving assist control is not actuated and therefore unlikely works as excessive control for the skilled driver.

The control unit 5 sets the brake moment amount to a larger value when the driver is operating the steering wheel 10 in the direction for making the steering angle closer to the target steering angle than when the driver is operating the steering wheel 10 in the direction for making the steering angle farther away from the target steering angle. In other words, when the route standard yaw rate does not match the driver's steering intention, the driving assist system can reduce the feeling of strangeness evoked in the driver by reducing the degree of the intervention of the driving assist. Further, when the driver is operating the steering wheel 10 in the direction for making the steering angle farther away from the target steering angle, the driving assist system can prevent the intervention of the driving assist that does not comply with the driver's steering intention by setting the brake moment amount to zero.

Other Embodiments

Having described the embodiment for implementing the present invention, the specific configuration of the present invention is not limited to the configuration of the embodiment, and the present invention also includes a design modification and the like thereof made within a range that does not depart from the spirit of the present invention. Further, the individual components described in the claims and the specification can be arbitrarily combined or omitted within a range that allows them to remain capable of achieving at least a part of the above-described objects or producing at least a part of the above-described advantageous effects.

The acquisition of the route standard yaw rate is not limited to the above-described example as long as the control unit 5 can acquire the route standard yaw rate. Therefore, the route standard yaw rate calculation portion 15 may be externally disposed.

The acquisition of the road information ahead of the vehicle and the vehicle motion amount (the steering angle and the vehicle body speed) is not limited to the above-described example as long as the control unit 5 can acquire them. Therefore, the control unit 5 may be configured to include the external world recognition portion 11, the steering angle sensor 12, and the vehicle body speed sensor 13.

The lateral acceleration may be used as the standard vehicle motion amount instead of the yaw rate.

In a case of a vehicle equipped with a so-called steer-by-wire steering apparatus, in which a steering wheel and a steering mechanism are mechanically decoupled from each other, the present invention can be applied by using an electric motor that steers the front wheels as the actuator portion.

In the following description, other configurations recognizable from the above-described embodiments will be described.

A driving assist apparatus, in one configuration thereof, includes a standard running route acquisition portion configured to acquire a standard running route calculated based on curve information ahead of a vehicle that is acquired by an external world recognition portion, and an actuator control output portion configured to acquire a standard vehicle motion amount when the vehicle runs the standard running route, calculate an instruction that guides a motion amount of the vehicle toward the standard vehicle motion amount based on the standard vehicle motion amount and a current vehicle motion amount of the vehicle, and output the instruction to an actuator portion configured to provide at least one of a curving force and a braking force to the vehicle.

According to another configuration, in the above-described configuration, the current vehicle motion amount is a current vehicle body speed and a current steering angle of a steering wheel. The actuator portion includes a brake apparatus capable of braking the vehicle. The actuator control output portion acquires a standard yaw rate generated when the vehicle runs the standard running route, calculates a brake output instruction for generating a yaw moment that makes a yaw rate acquired based on the current vehicle body speed and the current steering angle closer to the standard yaw rate on the vehicle, and outputs the brake output instruction to the brake apparatus.

According to another configuration, in any of the above-described configurations, the brake output instruction is an instruction for generating the yaw moment on the vehicle by providing a braking torque to one or both of rear wheels of the vehicle.

According to further another configuration, in any of the above-described configurations, the brake output instruction is an instruction for generating the yaw moment on the vehicle by providing the braking torque to any one of the rear wheels.

According to further another configuration, in any of the above-described configurations, the actuator portion includes a steering assist apparatus capable of changing the steering angle, and a driving apparatus configured to provide a driving torque to a driving wheel of the vehicle. The actuator control output portion acquires a required steering angle for running the standard running route at the current vehicle body speed and an appropriate vehicle body speed at which a lateral acceleration matches or falls below a predetermined value when the vehicle runs the standard running route, calculates an assist torque output instruction for providing a steering angle change amount that makes the current steering angle closer to the required steering angle to the steering wheel and a torque output instruction for providing a driving torque reduction amount that makes the current vehicle body speed closer to the appropriate vehicle body speed to the driving wheel, and outputs the assist torque output instruction and the torque output instruction to the steering assist apparatus and the driving apparatus, respectively. A weight is assigned to the brake output instruction based on the assist torque output instruction and the torque output instruction.

According to further another configuration, in any of the above-described configurations, the current vehicle motion amount is a current vehicle body speed and a current steering angle of a steering wheel. The actuator portion includes a steering assist apparatus capable of changing the steering angle. The actuator control output portion acquires a required steering angle for running the standard running route at the current vehicle body speed, calculates an assist torque output instruction for providing a steering angle change amount that makes the current steering angle closer to the required steering angle to the steering wheel, and outputs the assist torque output instruction to the steering assist apparatus.

According to further another configuration, in any of the above-described configurations, the actuator portion includes a steering assist apparatus capable of changing the steering angle and a driving apparatus configured to provide a driving torque to a driving wheel of the vehicle. The actuator control output portion acquires a standard yaw rate generated when the vehicle runs the standard running route and an appropriate vehicle body speed at which a lateral acceleration matches or falls below a predetermined value when the vehicle runs the standard running route, calculates a brake torque output instruction for generating a yaw moment that makes the yaw rate acquired based on the current vehicle body speed and the current steering angle closer to the standard yaw rate on the vehicle and a torque output instruction for providing a driving torque reduction amount that makes the current vehicle body speed closer to the appropriate vehicle body speed to the driving wheel, and outputs the brake output instruction and the torque output instruction to the brake apparatus and the driving apparatus, respectively. A weight is assigned to the assist torque output instruction based on the brake output instruction and the torque output instruction.

According to further another configuration, in any of the above-described configurations, the actuator includes a driving apparatus configured to provide a driving torque to a driving wheel of the vehicle. The actuator control output portion acquires an appropriate vehicle body speed at which a lateral acceleration matches or falls below a predetermined value when the vehicle runs the standard running route, calculates a torque output instruction for providing a driving torque reduction amount that makes a current vehicle body speed closer to the appropriate vehicle body speed to the driving wheel, and outputs the torque output instruction to the driving apparatus.

According to further another configuration, in any of the above-described configurations, the actuator portion includes a brake apparatus capable of braking the vehicle and a steering assist apparatus capable of changing a steering angle of a steering wheel of the vehicle. The actuator control output portion acquires a standard yaw rate generated when the vehicle runs the standard running route and a required steering angle for running the standard running route at the current vehicle body speed, calculates a brake torque output instruction for generating a yaw moment that makes the yaw rate acquired based on the current vehicle body speed and a current steering angle closer to the standard yaw rate on the vehicle and an assist torque output instruction for providing a steering angle change amount that makes the current steering angle closer to the required steering angle to the steering wheel, and outputs the brake output instruction and the assist torque output instruction to the brake apparatus and the steering assist apparatus, respectively. A weight is assigned to the torque output instruction based on the brake output instruction and the assist torque output instruction.

According to further another configuration, in any of the above-described configurations, the actuator control output portion gradually reduces the instruction to output to the actuator portion to zero when a failure has occurred in the external world recognition portion.

According to further another configuration, in any of the above-described configurations, the actuator control output portion does not output the instruction to the actuator portion when a difference of the current vehicle motion amount from the standard vehicle motion amount is smaller than a predetermined value.

According to further another configuration, in any of the above-described configurations, the actuator control output portion calculates an instruction that guides the motion amount of the vehicle toward the standard vehicle motion amount to a higher degree when a driver is performing a driving operation in a direction for making the motion amount of the vehicle closer to the standard vehicle motion amount than when the driver is performing the driving operation in a direction for making the vehicle motion amount farther away from the standard vehicle motion amount.

According to further another configuration, in any of the above-described configurations, the actuator control output portion does not guide the motion amount of the vehicle toward the standard vehicle motion amount when the driver is performing the driving operation in the direction for making the motion amount of the vehicle farther away from the standard vehicle motion amount.

Further, from another aspect, a driving assist apparatus, in one configuration thereof, functions in the following manner. When a vehicle enters a curving road and runs in a curving manner after running straight on a straight road, the driving assist apparatus provides a braking torque to a rear wheel of the vehicle to generate a moment on the vehicle if the vehicle has not been steered via a steering wheel on the straight road immediately before the entry to the curving road.

According to another configuration, in the above-described configuration, the rear wheel is a rear left wheel or a rear right wheel.

Further, from another aspect, a driving assist method, in one configuration thereof, includes a step of acquiring a standard running route calculated based on curve information ahead of a vehicle, a step of acquiring a standard vehicle motion amount when the vehicle runs the standard running route, a step of acquiring a current vehicle motion amount, a step of calculating an instruction that guides a motion amount of the vehicle toward the standard vehicle motion based on the standard vehicle motion amount and the current vehicle motion amount, and a step of outputting the instruction to an actuator portion configured to provide at least one of a curving force and a braking force to the vehicle.

According to another configuration, in the above-described configuration, the actuator portion includes a brake apparatus capable of braking the vehicle. The step of acquiring the standard vehicle motion amount includes a step of acquiring a standard yaw rate generated when the vehicle runs the standard running route. The step of calculating the instruction includes a step of calculating a brake output instruction for generating a yaw moment that makes a yaw rate acquired based on a current vehicle body speed and a current steering angle closer to the standard yaw rate on the vehicle. The step of outputting the instruction includes a step of outputting the brake output instruction to the brake apparatus.

According to another configuration, in any of the above-described configurations, the brake output instruction is an instruction for generating the yaw moment on the vehicle by providing a braking torque to one or both of rear wheels of the vehicle.

According to further another configuration, in any of the above-described configurations, the brake output instruction is an instruction for generating the yaw moment on the vehicle by providing the braking torque to any one of the rear wheels.

Further, from another aspect, a driving assist system, in one configuration thereof, includes an external world recognition portion configured to acquire curve information ahead of a vehicle, a controller configured to calculate a standard running route based on the curve information, calculate a standard vehicle motion amount generated when the vehicle runs the standard running route, and calculate and output an instruction that guides a motion amount of the vehicle toward the standard vehicle motion amount based on the standard vehicle motion amount and a current vehicle motion amount of the vehicle, and an actuator portion configured to provide at least one of a curving force and a braking force to the vehicle according to the instruction.

According to another configuration, in the above-described configuration, the current vehicle motion amount is a current vehicle body speed and a current steering angle of a steering wheel. The actuator portion includes a brake apparatus capable of braking the vehicle. The controller acquires a standard yaw rate generated when the vehicle runs the standard running route, calculates a brake output instruction for generating a yaw moment that makes the yaw rate acquired based on the current vehicle body speed and the current steering angle closer to the standard yaw rate on the vehicle, and outputs the brake output instruction to the brake apparatus.

According to another configuration, in any of the above-described configurations, the brake output instruction is an instruction for generating the yaw moment on the vehicle by providing a braking torque to one or both of rear wheels of the vehicle.

According to further another configuration, in any of the above-described configurations, the brake output instruction is an instruction for generating the yaw moment on the vehicle by providing the braking torque to any one of the rear wheels.

The present application claims priority under the Paris Convention to Japanese Patent Application No. 2017-165253 filed on Aug. 30, 2017. The entire disclosure of Japanese Patent Application No. 2017-165253 filed on Aug. 30, 2017 including the specification, the claims, the drawings, and the abstract is incorporated herein by reference in its entirety.

REFERENCE SIGN LIST 1 engine (actuator portion and driving apparatus)
5 control unit (actuator control output portion and controller)
6 brake apparatus (actuator portion)
8 electric power steering apparatus (actuator portion and steering assist apparatus)
11 external world recognition portion
14 target route calculation portion (standard running route acquisition portion)

The invention claimed is:

1. A driving assist apparatus comprising:
a standard running route acquisition portion configured to acquire a standard running route calculated based on curve information ahead of a vehicle that is acquired by at least one of a camera, a GPS, and a map database; and
an actuator control output portion configured to acquire a standard vehicle motion amount when the vehicle runs the standard running route, including a standard yaw rate, a required steering angle, and an appropriate vehicle body speed, calculate an instruction that guides a current vehicle motion amount of the vehicle toward the standard vehicle motion amount based on the standard vehicle motion amount and the current vehicle motion amount, including a current vehicle body speed and a current steering angle of a steering wheel, and output the instruction to an actuator portion, including a steering assist apparatus capable of changing a steering angle, a driving apparatus configured to provide a driving torque to a driving wheel of the vehicle, and a brake apparatus capable of braking the vehicle, configured to provide at least one of a curving force and a braking force to the vehicle,
wherein the actuator control output portion acquires the required steering angle for running the standard running route at the current vehicle body speed and the appropriate vehicle body speed at which a lateral acceleration matches or falls below a predetermined value when the vehicle runs the standard running route, calculates an assist torque output instruction reference value for providing a steering angle change amount that makes the current steering angle closer to the required steering angle to the steering wheel and a torque output instruction reference value for providing a driving torque reduction amount that makes the current vehicle body speed closer to the appropriate vehicle body speed to the driving wheel, acquires the standard yaw rate generated when the vehicle runs the standard running route, calculates a brake output instruction reference value for generating a yaw moment that makes a yaw rate acquired based on the current vehicle body speed and the current steering angle closer to the standard yaw rate on the vehicle, calculates a brake output instruction by multiplying the brake output instruction reference value by a brake moment amount weight which reduces as the assist torque output instruction reference value or the torque output instruction reference value increases, and outputs an assist torque output instruction based on the assist torque output instruction reference value, a torque output instruction based on torque output instruction reference value, and the brake output instruction to the steering assist apparatus, the driving apparatus, and the brake apparatus, respectively.

2. The driving assist apparatus according to claim 1, wherein the brake output instruction is an instruction for generating the yaw moment on the vehicle by providing a braking torque to one or both of rear wheels of the vehicle.

3. The driving assist apparatus according to claim 1, wherein the assist torque output instruction is calculated by multiplying the assist torque output instruction reference value by an assist torque correction coefficient weight which reduces as the brake output instruction reference value or the torque output instruction reference value increases.

4. The driving assist apparatus according to claim 1, wherein the torque output instruction is calculated by multiplying the torque output instruction reference value by an engine torque correction coefficient weight which reduces as the brake output instruction reference value or the assist torque output instruction reference value increases.

5. The driving assist apparatus according to claim 1, wherein the actuator control output portion gradually reduces the instruction to output to the actuator portion to zero when a failure has occurred in the at least one of a camera, a GPS, and a map database.

6. The driving assist apparatus according to claim 1, wherein the actuator control output portion does not output the instruction to the actuator portion when a difference of the current vehicle motion amount from the standard vehicle motion amount is smaller than a predetermined value.

7. The driving assist apparatus according to claim 1, wherein the actuator control output portion calculates an instruction that guides the motion amount of the vehicle toward the standard vehicle motion amount to a higher degree when a driver is performing a driving operation in a direction for making the motion amount of the vehicle closer to the standard vehicle motion amount than when the driver is performing the driving operation in a direction for making the vehicle motion amount farther away from the standard vehicle motion amount.

8. The driving assist apparatus according to claim 7, wherein the actuator control output portion does not guide the motion amount of the vehicle toward the standard vehicle motion amount when the driver is performing the driving operation in the direction for making the motion amount of the vehicle farther away from the standard vehicle motion amount.

9. A driving assist method comprising:
a step of acquiring a standard running route calculated based on curve information ahead of a vehicle; and
a step of acquiring a current vehicle body speed and a current steering angle of a steering wheel as a current vehicle motion amount,
wherein a standard vehicle motion amount when the vehicle runs the standard running route is a standard yaw rate, a required steering angle, and an appropriate vehicle body speed,
the method further comprising:
a step of acquiring the required steering angle for running the standard running route at the current vehicle body speed and the appropriate vehicle body speed at which a lateral acceleration matches or falls below a predetermined value when the vehicle runs the standard running route;
a step of calculating an assist torque output instruction reference value for providing a steering angle change amount that makes the current steering angle closer to the required steering angle to the steering wheel and a torque output instruction reference value for providing a driving torque reduction amount that makes the current vehicle body speed closer to the appropriate vehicle body speed to a driving wheel of the vehicle;
a step of acquiring the standard yaw rate generated when the vehicle runs the standard running route;
a step of calculating a brake output instruction reference value for generating a yaw moment that makes a yaw rate acquired based on the current vehicle body speed and the current steering angle closer to the standard yaw rate on the vehicle;
a step of calculating a brake output instruction by multiplying the brake output instruction reference value by a brake moment amount weight which reduces as the assist torque output instruction reference value or the torque output instruction reference value increases; and
a step of outputting an assist torque output instruction based on the assist torque output instruction reference value, a torque output instruction based on torque output instruction reference value, and the brake output instruction to a steering assist apparatus capable of changing a steering angle, a driving apparatus configured to provide a driving torque to a driving wheel of the vehicle, and a brake apparatus capable of braking the vehicle, respectively.

10. A driving assist system comprising:
at least one of a camera, a GPS, and a map database configured to acquire curve information ahead of a vehicle; and
a controller configured to:
calculate a standard running route based on the curve information; and
acquire a current vehicle body speed and a current steering angle of a steering wheel as a current vehicle motion amount,
wherein a standard vehicle motion amount when the vehicle runs the standard running route is a standard yaw rate, a required steering angle, and an appropriate vehicle body speed,
the controller further configured to:
acquire the required steering angle for running the standard running route at the current vehicle body speed and the appropriate vehicle body speed at which a lateral acceleration matches or falls below a predetermined value when the vehicle runs the standard running route;
calculate an assist torque output instruction reference value for providing a steering angle change amount that makes the current steering angle closer to the required steering angle to the steering wheel and a torque output instruction reference value for providing a driving torque reduction amount that makes the current vehicle body speed closer to the appropriate vehicle body speed to a driving wheel of the vehicle;
acquire the standard yaw rate generated when the vehicle runs the standard running route;
calculate a brake output instruction reference value for generating a yaw moment that makes a yaw rate acquired based on the current vehicle body speed and the current steering angle closer to the standard yaw rate on the vehicle;
calculate a brake output instruction by multiplying the brake output instruction reference value by a brake moment amount weight which reduces as the assist torque output instruction reference value or the torque output instruction reference value increases; and
output an assist torque output instruction based on the assist torque output instruction reference value, a torque output instruction based on torque output instruction reference value, and the brake output instruction to a steering assist apparatus capable of changing a steering angle, a driving apparatus configured to provide a driving torque to a driving wheel of the vehicle, and a brake apparatus capable of braking the vehicle, respectively.

* * * * *